(12) United States Patent
Asbag et al.

(10) Patent No.: US 11,138,507 B2
(45) Date of Patent: Oct. 5, 2021

(54) SYSTEM, METHOD AND COMPUTER PROGRAM PRODUCT FOR CLASSIFYING A MULTIPLICITY OF ITEMS

(71) Applicant: Applied Materials Israel Ltd., Rehovot (IL)

(72) Inventors: Assaf Asbag, Alfei Menashe (IL); Boaz Cohen, Lehavim (IL)

(73) Assignee: Applied Materials Israel LTD., Rehovot (IL)

( * ) Notice: Subject to any disclaimer, the term of this patent is extended or adjusted under 35 U.S.C. 154(b) by 215 days.

(21) Appl. No.: 15/719,433

(22) Filed: Sep. 28, 2017

(65) Prior Publication Data
US 2019/0095800 A1    Mar. 28, 2019

(51) Int. Cl.
| | |
|---|---|
| *G06F 3/048* | (2013.01) |
| *G06T 7/00* | (2017.01) |
| *G06N 5/02* | (2006.01) |
| *G06F 3/0482* | (2013.01) |
| *G06K 9/62* | (2006.01) |
| *G06K 9/46* | (2006.01) |

(Continued)

(52) U.S. Cl.
CPC .......... *G06N 5/022* (2013.01); *G06F 3/0482* (2013.01); *G06K 9/4604* (2013.01); *G06K 9/6218* (2013.01); *G06K 9/6253* (2013.01); *G06K 9/6277* (2013.01); *G06K 9/6279* (2013.01); *G01N 21/9501* (2013.01); *G01N 2021/8854* (2013.01); *G06K 2209/19* (2013.01)

(58) Field of Classification Search
CPC ............. G06T 2207/30148; G06T 7/00; G06F 3/04847; G06F 3/0482; G06N 5/022; G06K 9/4604; G06K 9/6253; G06K 9/6279

USPC ................................................ 715/200, 771
See application file for complete search history.

(56) References Cited

U.S. PATENT DOCUMENTS

| | | | | | |
|---|---|---|---|---|---|
| 5,544,256 | A | * | 8/1996 | Brecher ................ | G06T 7/0006 382/149 |
| 5,966,459 | A | * | 10/1999 | Chen ........................ | G06K 9/00 348/126 |

(Continued)

OTHER PUBLICATIONS

Wu, T. F., Lin, C. J., & Weng, R. C. (2004). Probability estimates for multi-class classification by pairwise coupling. Journal of Machine Learning Research, 5(Aug), 975-1005.).

(Continued)

*Primary Examiner* — Manglesh M Patel
(74) *Attorney, Agent, or Firm* — Lowenstein Sandler LLP

(57) ABSTRACT

A system, method and computer software product, the system capable of classifying defects and comprising: an hardware-based GUI component; and a processing and memory circuitry configured to: a. upon obtaining data informative of a plurality of defects and attribute values thereof, using the attribute values to create initial classification of the plurality of defects into a plurality of classes; b. for a given class, presenting to a user, by the hardware-based GUI component, an image of a defect initially classified to the given class with a low likelihood, wherein the image is presented along with images of one or more defects initially classified to the given class with the highest likelihood; and c. subject to confirming by the user, using the hardware-based GUI component, that the at least one defect is to be classified to the given class, indicating the at least one defect as belonging to the given class.

20 Claims, 5 Drawing Sheets

(51) Int. Cl.
*G01N 21/95* (2006.01)
*G01N 21/88* (2006.01)

(56) References Cited

U.S. PATENT DOCUMENTS

| | | | | |
|---|---|---|---|---|
| 6,185,511 | B1* | 2/2001 | Steffan | G06K 9/00 |
| | | | | 257/E21.525 |
| 6,456,899 | B1* | 9/2002 | Gleason | G03F 7/7065 |
| | | | | 700/110 |
| 6,657,221 | B2* | 12/2003 | Nakagaki | G01N 21/9501 |
| | | | | 250/201.3 |
| 6,922,482 | B1* | 7/2005 | Ben-Porath | G06K 9/6268 |
| | | | | 382/146 |
| 7,020,536 | B2* | 3/2006 | Lin | G01N 21/93 |
| | | | | 700/110 |
| 7,113,628 | B1* | 9/2006 | Obara | G06T 7/001 |
| | | | | 356/237.1 |
| 7,162,071 | B2* | 1/2007 | Hung | G06T 7/001 |
| | | | | 382/144 |
| 7,904,845 | B2* | 3/2011 | Fouquet | G03F 7/7065 |
| | | | | 324/762.05 |
| 8,532,949 | B2* | 9/2013 | Teh | G01N 21/9501 |
| | | | | 702/81 |
| 10,223,615 | B2* | 3/2019 | Ma | G06K 9/6269 |
| 2003/0164942 | A1* | 9/2003 | Take | G01N 21/9501 |
| | | | | 356/237.2 |
| 2004/0234120 | A1* | 11/2004 | Honda | G06T 7/0004 |
| | | | | 382/145 |
| 2011/0280470 | A1* | 11/2011 | Hayashi | G01N 21/9505 |
| | | | | 382/149 |
| 2013/0077850 | A1* | 3/2013 | Hirai | G06T 7/0004 |
| | | | | 382/149 |
| 2013/0294680 | A1* | 11/2013 | Harada | H01L 22/20 |
| | | | | 382/149 |
| 2013/0304399 | A1* | 11/2013 | Chen | G06T 7/0004 |
| | | | | 702/40 |
| 2017/0177997 | A1* | 6/2017 | Karlinsky | G06K 9/6271 |
| 2019/0370955 | A1* | 12/2019 | Zhang | G06K 9/6253 |
| 2020/0105500 | A1* | 4/2020 | Chou | H01J 37/153 |
| 2021/0027454 | A1* | 1/2021 | Peng | G06T 7/0004 |

OTHER PUBLICATIONS

Kremer, J., Steenstrup Pedersen, K., & Igel, C. (2014). Active learning with support vector machines. Wiley Interdisciplinary Reviews: Data Mining and Knowledge Discovery, 4(4), 313-326.

Joshi, A. J., Porikli, F., & Papanikolopoulos, N. (Jun. 2009). Multi-class active learning for image classification. In Computer Vision and Pattern Recognition, 2009. CVPR 2009. IEEE Conference on (pp. 2372-2379). IEEE.

"Difference between classification and clustering in data mining?" May 13, 2017, https://stackoverflow.com/questions/5064928/difference-between-classification-and-clustering-in-data-mining. Accessed Jun. 25, 2018.

Wikipedia, "Cluster analysis," Aug. 31, 2017, https://en.wikipedia.org/wiki/Cluster_analysis. Accessed Jun. 25, 2018.

\* cited by examiner

SYSTEM, METHOD AND COMPUTER PROGRAM PRODUCT FOR CLASSIFYING A MULTIPLICITY OF ITEMS

TECHNICAL FIELD

The presently disclosed subject matter relates to examining objects (e.g. wafers, reticles, etc.), and more particularly to classifying defects detected by examining captured images of the objects, and to creating a classification model.

BACKGROUND

Current demands for high density and performance associated with ultra large scale integration of fabricated devices, require submicron features, increased transistor and circuit speeds, and improved reliability. Such demands require formation of device features with high precision and uniformity, which, in turn, necessitate careful monitoring of the fabrication process, including frequent and detailed inspection of the devices while they are still in the form of semiconductor wafers.

The term "object" used in this specification should be expansively construed to cover any kind or specimen of wafer, masks, and other structures, combinations and/or parts thereof used for manufacturing semiconductor integrated circuits, magnetic heads, flat panel displays, and other semiconductor-fabricated articles.

The term "defect" used in this specification should be expansively construed to cover any kind of abnormality or undesirable feature formed on or within a wafer.

The complex manufacturing process of objects is not error-free and such errors may cause faults in the manufactured objects. The faults may include defects that can harm operation of the object, and nuisances, which may be defects, but do not cause any harm or malfunction of the manufactured unit. By way of non-limiting examples, defects may be caused during the manufacturing process, due to faults in the raw material, mechanical, electrical or optical errors, human errors or others. Further, defects may be caused by spatio-temporal factors, such as temperature changes of the wafer occurring after one or more manufacturing stages during the examination process, which may cause some deformations of the wafer. The examination process can also introduce further alleged errors, for example due to optical, mechanical or electrical problems in the examination equipment or process, which thus provide imperfect captures. Such errors may produce false positive findings, which may seem to contain a defect, but no actual defect exists at the area.

In many applications, the type, or class, of a defect is of importance. For example, defects may be classified into one of a number of classes, such as a particle, a scratch, process, or the like.

Unless specifically stated otherwise, the term "examination" used in this specification should be expansively construed to cover any kind of detection and/or classification of defects in an object. Examination is provided by using non-destructive inspection tools during or after manufacture of the object to be examined. By way of non-limiting example, the examination process can include scanning (in a single or in multiple scans), sampling, reviewing, measuring, classifying and/or other operations provided with regard to the object or parts thereof, using one or more inspection tools. Likewise, examination can be provided prior to manufacture of the object to be examined and can include, for example, generating an examination recipe(s). It is noted that, unless specifically stated otherwise, the term "examination", or its derivatives used in this specification, is not limited with respect to the size of the inspected area, or to the speed or resolution of the scanning. A variety of non-destructive inspection tools includes, by way of non-limiting example, optical inspection tools, scanning electron microscopes, atomic force microscopes, etc.

The examination process can include a plurality of examination steps. During the manufacturing process, the examination steps can be performed a multiplicity of times, for example after the manufacturing or processing of certain layers, or the like. Additionally or alternatively, each examination step can be repeated multiple times, for example for different wafer locations or for the same wafer locations with different examination settings.

By way of non-limiting example, run-time examination can employ a two-step procedure, e.g. inspection of a specimen followed by review of sampled defects. During the inspection step, the surface of a specimen or a part thereof (e.g. areas of interest, hot spots, etc.) is typically scanned at relatively high-speed and/or low-resolution. The captured inspection image is analyzed in order to detect defects and obtain locations and other inspection attributes thereof. At the review step the images of at least some of the defects detected during the inspection phase are, typically, captured at relatively low speed and/or high-resolution, thereby enabling classification and, optionally, other analyses of the at least some of the defects. In some cases both phases can be implemented by the same inspection tool, and, in some other cases, these two phases are implemented by different inspection tools.

SUMMARY

One aspect of the disclosed subject matter relates to a system capable of classifying defects, comprising: an hardware-based GUI component; and a processing and memory circuitry (PMC) configured to: upon obtaining data informative of a plurality of defects and attribute values thereof, using the attribute values to create an initial classification of the plurality of defects into a plurality of classes; for a given class from the plurality of classes, presenting to a user, by the hardware-based GUI component, an image of a defect initially classified to the given class with a low likelihood, wherein the image is presented along with images of one or more defects initially classified to the given class with the highest likelihood; and subject to confirming by the user, using the hardware-based GUI component, that the at defect is to be classified to the given class, indicating the defect as belonging to the given class. Within the system, the PMC is optionally further configured to repeat operations b) and c) for a predefined number of defects initially classified to the given class with a lowest likelihood, or for all defects initially classified to the given class with a likelihood lower than a predefined threshold likelihood. Within the system, the initial classification of the plurality of defects into the plurality of classes optionally comprises: clustering the plurality of defects into clusters in accordance with the attribute values; presenting to a user, by the hardware-based GUI component, one or more defects clustered to a cluster from the clusters; and creating a class based on the cluster, subject to receiving approval from the user, using the hardware-based GUI component, that the one or more defects form a cluster, and receiving an identifier for the class. Within the system, the PMC is optionally further configured to: subject to rejecting by the user, using the hardware-based GUI component, that the defect is to be classified to the given class: present to a user, using the hardware-based GUI component, the defect with a representation of a second class; and subject to confirming by the user, using the hardware-based GUI component, that the defect is to be classified to the second class, indicate the defect as belonging to the second class. Within the system, a first likelihood that the defect is classified to the given class is optionally higher than a likelihood that the defect is classified to the second class. Within the system, the PMC is optionally further configured to: subject to receiving rejection from the user, using the hardware-based GUI component, that the defect is to be classified to the second class: present to a user, using the hardware-based GUI component, the defect with a multiplicity of additional defects; and receive from the user, using the hardware-based GUI component, an identifier of a third class; and indicate the defect as belonging to the third class. Within the system, the PMC is optionally further configured to: receive from the user, using the hardware-based GUI component, an indication to an additional defect from the multiplicity of additional defects; and indicate the additional defect as belonging to the third class. Within the system, the PMC is optionally further configured to: upon completing presenting to the user defects classified to the plurality of classes: present to a user a non-associated defect; receive from the user an identifier of a fourth class with which the non-associated defect is to be associated; and associate the non-associated defect with the fourth class. Within the system, the PMC is optionally further configured to use the plurality of defects as associated with the plurality of classes for a purpose selected from the group consisting of: training a classifier based on association of items to classes, determining configuration parameters of an examination tool, and specimen design.

Another aspect of the disclosed subject matter relates to a method of classifying defects in a specimen into a plurality of classes, the method comprising: upon obtaining by a processing and memory circuitry (PMC) data informative of a plurality of defects and attribute values thereof, using the attribute values to initially classify, using the PMC, the plurality of defects into the plurality of classes; for a given class from the plurality of classes, presenting to a user an image of a defect initially classified to the given class with a low likelihood, wherein the image is presented along with images of one or more defects initially classified to the given class with the highest likelihood; and subject to confirming by the user that the defect is to be classified to the given class, indicating the defect as belonging to the given class. The method can further comprise repeating operations b) and c) for a predefined number of defects initially classified to the given class with a lowest likelihood, or for all defects initially classified to the given class with a likelihood lower than a predefined threshold likelihood. Within the method, the initial classification of the plurality of defects into the plurality of classes optionally comprises: clustering the plurality of defects into clusters in accordance with the attribute values; presenting to a user one or more defects clustered to a cluster from the clusters; and creating a class based on the cluster, subject to receiving approval from the user that the one or more defects form a cluster, and receiving an identifier for the class. The method can further comprise: subject to rejecting by the user that the defect is to be classified to the given class: presenting to a user the defect with a representation of a second class; and subject to confirming by the user that the defect is to be classified to the second class, indicating the defect as belonging to the second class. Within the method, a first likelihood that the e defect is classified to the given class is optionally higher than a likelihood that the defect is classified to the second class. The method can further comprise: subject to receiving rejection of the user that the defect is to be classified to the second class: presenting to a user the defect with a multiplicity of additional defects; and receiving from the user an identifier of a third class; and indicating the defect as belonging to the third class. The method can further comprise: receiving from the user an indication to an additional defect from the multiplicity of additional defects; and indicating the additional defect as belonging to the third class. The method can further comprise: upon completing presenting to the user defects classified to the plurality of classes: presenting to a user a non-associated defect; receiving from the user an identifier of a fourth class with which the non-associated defect is to be associated; and associating the non-associated defect with the fourth class. The method can further comprise using the plurality of defects as associated with the plurality of classes for a purpose selected from the group consisting of: training a classifier based on association of items to classes, determining configuration parameters of an examination tool, and specimen design.

Another aspect of the disclosed subject matter relates to a computer software product, comprising a non-transitory computer-readable medium in which program instructions are stored, which instructions, when read by a computer, cause the computer to: upon obtaining by the data informative of a plurality of defects and attribute values thereof, using the attribute values to enable initial classification the plurality of defects into a plurality of classes; for a given class from the plurality of classes, presenting to a user an image of a defect initially classified to the given class with a low likelihood, wherein the image is presented along with images of one or more defects initially classified to the given class with the highest likelihood; and subject to confirming by the user that the defect is to be classified to the given class, indicating the defect as belonging to the given class.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
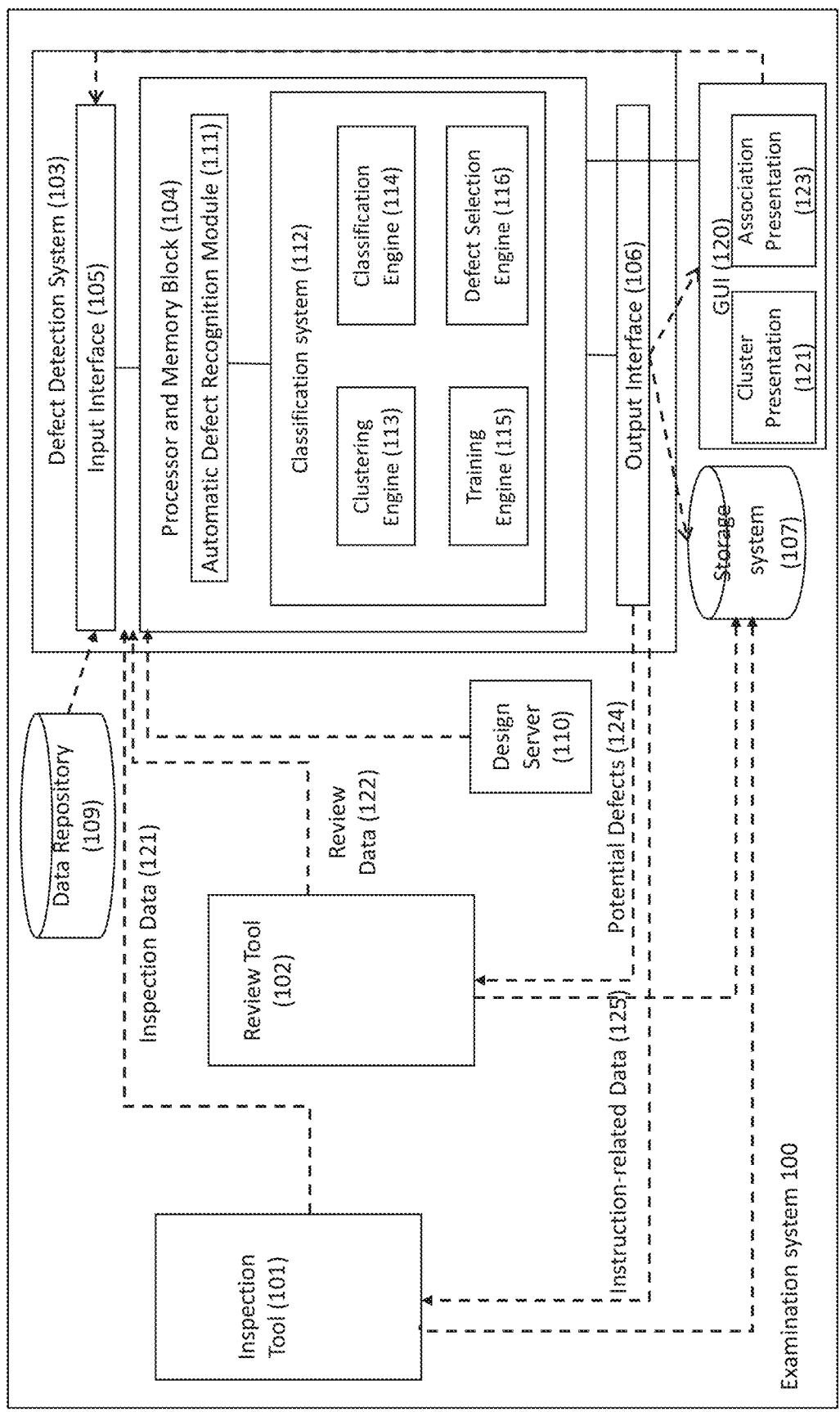
FIG. 1 illustrates a block diagram of an examination system, in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "determining", "calculating", "processing", "computing", "representing", "comparing", "generating", "assessing", "matching", "processing", "selecting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, an FPEI system and parts thereof disclosed in the present application.

The term "classification" used in this specification should be expansively construed to cover any kind of assigning items into a collection of classes, such that each item is assigned to one class. The classes may be defined by a user or otherwise received. A training set may also be received, which comprises a collection of items and the class to which each item is assigned. A classifier may then be trained upon the training set, such that further items can be classified according to their similarity or dissimilarity to items from the training set or to characteristics of the classes determined by the training.

The term "active learning" used in this specification should be expansively construed to cover any kind of semi-supervised machine learning in which a learning algorithm is able to query a user or another source of information source to obtain the output related to input, such as one or more data points. In many cases, such as when capturing defects, a plethora of data is available, however manual or other trustable labeling is costly. In such a scenario, learning algorithms can actively and iteratively query a user for labels.

When examining objects, each defect may be characterized by values assigned to a multiplicity of attributes, such as size, color, background color, context of appearance, shape, texture, or the like. The attribute number is not limited and can vary between one and thousands. A classifier may be trained, and classification may be based on the vicinity between items, or on the vicinity between an item and characteristics of the classes. Vicinity may be defined in accordance with an applicable distance function, for example a distance defined based on the attribute space and the value range for each attribute.

Each defect may then be automatically classified into one of a number of classes, such as a particle, a scratch, process, or the like, based on its attribute values.

The terms "non-transitory memory" and "non-transitory storage medium" used herein should be expansively construed to cover any volatile or non-volatile computer memory suitable to the presently disclosed subject matter.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a generalized block diagram of an examination system in accordance with certain embodiments of the presently disclosed subject matter. Examination system 100 illustrated in FIG. 1 can be used for examination of an object (e.g. of a wafer and/or parts thereof) for defects. The examination can be a part of the object fabrication and can be carried out during manufacturing of the object or afterwards. The illustrated examination system 100 comprises computer-based system 103 capable of automatically determining metrology-related and/or defect-related information using images obtained before, during or after object fabrication (referred to hereinafter as fabrication process (FP) images) and/or derivatives thereof. Defect detection system 103 is referred to hereinafter as Fabrication Process Examination Information (FPEI) system 103. FPEI system 103 can be operatively connected to one or more inspection tools 101 and/or one or more review tools 102. Inspection tools 101 are configured to capture inspection images (typically, at relatively high-speed and/or low-resolution). Review tools 102 are configured to capture review images of at least some of the defects detected by inspection tools 101 (typically, at relatively low-speed and/or high-resolution).

FPEI system 103 can be further operatively connected to design server 110 and data repository 109.

An object can be examined by an inspection tool 101 (e.g. an optical inspection system, low-resolution SEM, etc.). The resulting images and/or derivatives thereof informative of revealed potential defects (collectively referred to hereinafter as inspection data 121) can be transmitted—directly or via one or more intermediate systems—to FPEI system 103. As will be further detailed with reference to the figures below, FPEI system 103 is configured to receive, via input interface 105, data produced by inspection tool 101 and/or data stored in one or more data repositories 109 and/or in design server 110, data such as indications received from a user using a hardware-based graphical user interface (GUI) 120 and/or another relevant data depository. Inspection data 121 can be indicative of locations of potential defects and other attributes thereof.

FPEI system 103 is further configured to process the received data and send, via output interface 106, the results (or part thereof) to a storage system 107, to examination tool(s), to a computer-based graphical user interface (GUI) 120 for rendering the results to a user for example over a display device (not shown), and/or to further examination tool(s), external systems or storage devices, and/or to external systems (e.g. Yield Management System (YMS) of a FAB, recipe node, etc.). GUI 120 can be further configured to enable user-specified inputs related to operating FPEI system 103 and in particular to classification system 112.

As will be further detailed with reference to the figures below, FPEI system 103 can be configured to process the received inspection data (optionally together with other data as, for example, design data and/or defect classification data) to select potential defects for review. It is noted that the potential defects for review are referred to hereinafter also as defects for review.

FPEI system 103 can send the processing results (e.g. instruction-related data 125 and/or potential defects 124) to any of the examination tool(s), store the results (e.g. defect classification) in storage system 107, render the results via GUI 108 and/or send to an external system (e.g. to YMS, recipe node, etc.).

The specimen can be further examined by review tool 102. A subset of potential defect locations selected for review in accordance with data generated by FPEI system 103 can be reviewed by a scanning electron microscope (SEM) or Atomic Force Microscopy (AFM), etc. The resulting data (referred to hereinafter as review data 122) informative of review images and/or derivatives thereof can be transmitted—directly or via one or more intermediate systems—to FPEI system 103 and can be used for further selection of potential defects for review, classifying the reviewed defects, etc.

FPEI system 103 comprises a processor and memory circuitry (PMC) 104 operatively connected to a hardware-based input interface 105 and to a hardware-based output interface 106. PMC 104 is configured to provide processing necessary for operating FPEI system 103 as further detailed with reference to the following figures, and comprises a processor (not shown separately) and a memory (not shown separately). The processor of PMC 104 can be configured to execute several functional modules in accordance with computer-readable instructions implemented on a non-transitory computer-readable memory comprised in PMC 104. Such functional modules are referred to hereinafter as comprised in PMC 104. Functional modules comprised in the processor include or are operatively connected to classification system 112, comprising clustering engine 113, classification engine 114 also referred to as classifier, training engine 115 and defect selection for presentation engine 116.

Those skilled in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least part of examination tools 101 and/or 102, data repositories 109, storage system 107 and/or GUI 108 can be external to examination system 100 and operate in data communication with FPEI system 103 via input interface 105 and output interface 106. FPEI system 103 can be implemented as stand-alone computer(s) to be used in conjunction with the examination tools. Alternatively, the respective functions of FPEI system 103 can, at least partly, be integrated with one or more examination tools, process control tools, recipe generation tools, systems for automatic defects review and/or classification, and/or other systems related to examination.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

Typically, an examined object is captured by inspection tool 101, capturing one or more images of the object or parts thereof. The images may cover the whole area of one or more layers in the object, or any part thereof. The images are taken and analyzed using a default recipe, or a recipe revised, for example, as a result of capturing a sample object of the type of the examined object.

An examination system analyzes the captured images and determines a multiplicity of potential defects' locations. Examination system 100 can then select from the potential defects a multiplicity of locations for review. The locations can be selected as corresponding to potential defects having a highest probability to be true defects, selecting locations in a uniform distribution over the object area, or in accordance with other considerations.

The selected locations, or some thereof, can then be imaged by review tool 102. The images can then be analyzed for determining whether each of the imaged locations indeed comprises a defect, by automatic defect recognition (ADR) module 111.

The true defects, and optionally additional ones, for example nuisances which are defects that cause no harm, may be expressed as a collection of values assigned to a multiplicity of attributes, and can be classified, using classification engine 114 of classification system 112 into one of a collection of predetermined classes. The terms classified and associated are used interchangeably in the disclosure below.

Additionally or alternatively, classification system 112 can be used for classifying a collection of items such as defects received from any other source at any other time. Classification system 112 can employ active learning techniques in order to efficiently obtain a training corpus. The active learning can include selecting a small number of examples and asking the user to review suggested classification for the examples, thus producing a training corpus for the classifier with relatively little effort of the user.

Classification engine 114 can be trained by classifier training engine 115 upon a training set, wherein following the training, classification engine 114 can classify defects. The training set can comprise a multiplicity of defects, each expressed as a collection of attribute values, and an association of each of the defects to one of the classes, also referred to as a label.

However, obtaining a training set is not trivial. A collection of defects, such as defects output by inspection tool 101 or by review tool 102 can comprise tens of thousands to millions of defects, wherein a classifier may be trained upon of them, for example in the order of magnitude of thousands. However, selecting samples to be labeled by a human is not trivial either. Random selection is likely to lead to over-representation of common defects or defects from dense areas, and under representation or no representation at all of other defects. It is also noted that when classifying a large number of defects, human errors may occur which may amount to an error rate of 40%. It will be appreciated that in other circumstances, too, it may be required to label or classify a large amount of defects, for example when the need arises to improve the classification. In another example, when calibrating a recipe, it may be required to scan the wafer and check the discovered defect population, which requires population classification in order to verify that all classes are represented. In another example, classified population can be used during the research and development (R&D) phase of a new object. Further examples relate to improving classifier performance, selecting automatic and consistent thresholds between ambiguous populations to reduce inconsistencies between operators, or the like.

Classification system 112 can be used for efficiently classifying a large number of defects, or other items, in a semi-automatic manner, as detailed below.

Figure 2A:
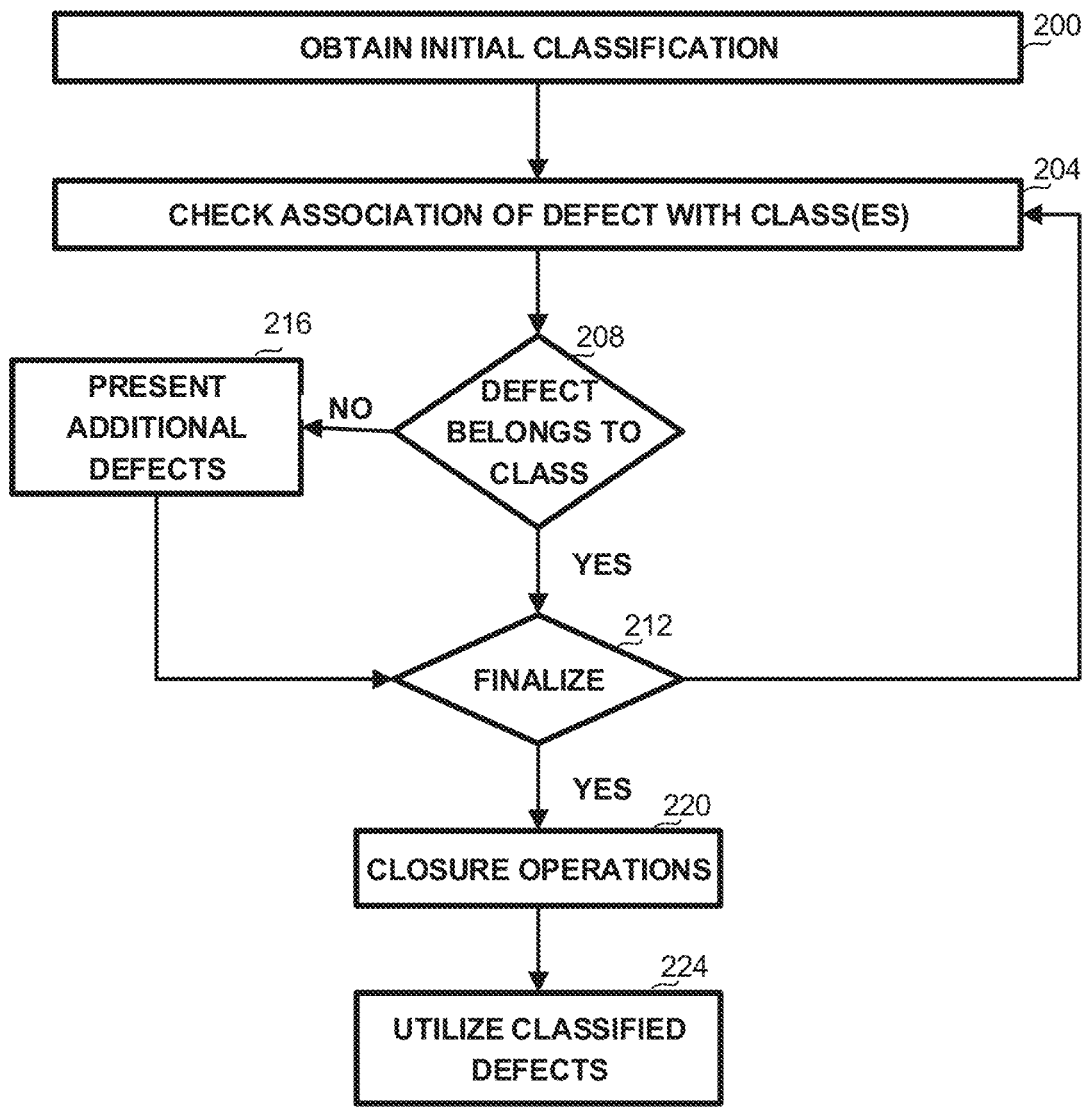
FIG. 2A illustrates a generalized flow-chart of a method for classifying defects, in accordance with certain embodiments of the presently disclosed subject matter.

Reference is now made to FIG. 2A, showing a generalized flow-chart of a process for classifying defects, in accordance with certain embodiments of the presently disclosed subject matter.

Classification system 112 can obtain (200) an initial classification of a multiplicity of defects into classes. The initial classification may be treated not as "ground truth" positively associating defects with classes, but more as a basis for further classification. The initial classification may be obtained by clustering the multiplicity of defects into clusters, presenting the classes to a user, and upon approval that defects are correctly clustered, providing an identifier, such as a name or a number, to each such cluster, thus regarding the cluster as a class.

Classification system 112 can activate association presentation module 123 for checking the association of defects to the classes (204). Checking can be performed for each of the classes, by presenting to a user a number of defects per each class, wherein the defects were automatically classified to the class, and the defect was classified with highest likelihood to the class. Each such presentation comprises presenting an image of the defect and images of other defects classified to the class (or images of defects initially classified to the class if no defects exist which are positively classified). The user can then decide whether the defect should indeed be associated with, e.g. classified to the class, or not. If the user indicates that the defect is not to be associated with the class, the defect may be presented again with one or more other classes to which the defect was automatically classified with lower likelihood. It will be determined that for each class, the defects presented to the user may be those whose classification to the class was most questionable. For example, if a first defect is classified to class A with certainty of 90% (and to other classes with lower likelihood), and a second defect is classified to class A with certainty of 20% (and to other classes with lower likelihood), then it is preferred to ask the user about the association of the second defect to class A, since the second defect can be more useful in assessing the class boundaries.

If the defect is not associated with any of the presented classes, the defect may be presented with other defects similar to it (216). For example, if each defect is represented as a collection of values for a multiplicity of attributes, then similar defects may be those defects which are closest to it in the attribute space. The user can then associate the defect, or other presented defects with any of the existing classes and is not limited to accepting or rejecting a presented class.

If it is determined (208) that the defect belongs to a class (the first presented class, the second presented class, or the like), unless the user chooses to finalize 212 the process, the process continues for further defects.

Once defects have been presented for all classes, or if the user manually selects to finalize the process, the process may be finalized (212). The process may be finalized by training the classifier upon the positively associated defects. The process may then be followed by a further iteration of presenting further non-associated defects and relevant classes to the user.

Once finalized, meaning that either the user asked to finalize, or a predetermined number of defects has been presented for each class and associated with that class or with another class, some closure operations (220) may be performed, depending on the specific application or requirements.

Figure 2B:
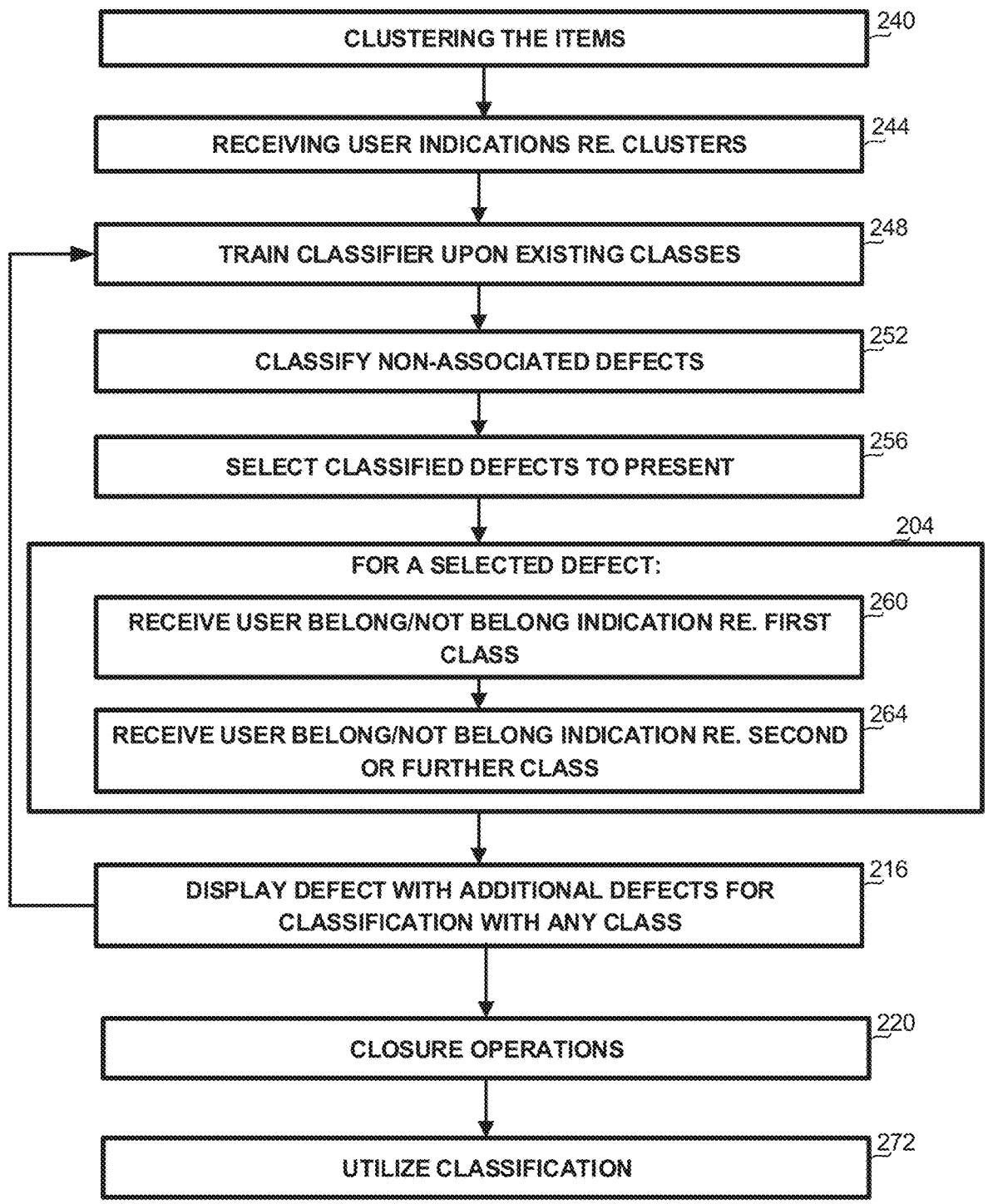
FIG. 2B illustrates a detailed flow-chart of a method for classifying defects, in accordance with certain embodiments of the presently disclosed subject matter.

Reference is now made to FIG. 2B, showing a detailed flow-chart of a process for classifying items such as defects, in accordance with certain embodiments of the presently disclosed subject matter.

Clustering engine 113 can receive a multiplicity of defects, each characterized or represented as a collection of attribute values. Clustering engine 113 can then cluster (240) the items into a plurality of clusters. Clustering can be based on the distances in the attribute space, but also on other metrics, based for example on information theory or probability metrics. It will also be appreciated that spatially exploring the attribute space is not limited to clustering, and other techniques may be used.

Clustering can use any unsupervised clustering method, such as but not limited to K-means or K-medoids clustering, wherein K is not given a-priori, mean shift clustering, hierarchical clustering, OPTICS+ clustering, GMM, spectral clustering or any other clustering method which is currently known or will become known in the future. The number of clusters may be limited to a number that can be managed by a human, such as between 10 and 100.

In some exemplary embodiments, clustering can start by selecting as cluster centers two farthest defects, wherein the distance between defects is measured in the attribute space. Then, a third defect which is farthest from the two defects, can be selected, wherein the distance can be determined as the sum of the distances from the two initial defects, sum of square distances, or the like. Thus, each next defect can be selected as the one farthest from all previously selected defects, until a required number of clusters is achieved. This approach may be regarded as exploration, in which it is attempted to form clusters having defects covering large parts of the attribute space.

Selecting farthest defects can also be used as an initialization method in itself, to be used instead of clustering.

Once the defects are clustered, user indications can be received (244) via cluster presentation module 121 of GUI 120, regarding one or more of the clusters. The user indication may be received following a display of the cluster to a user.

Figure 3:
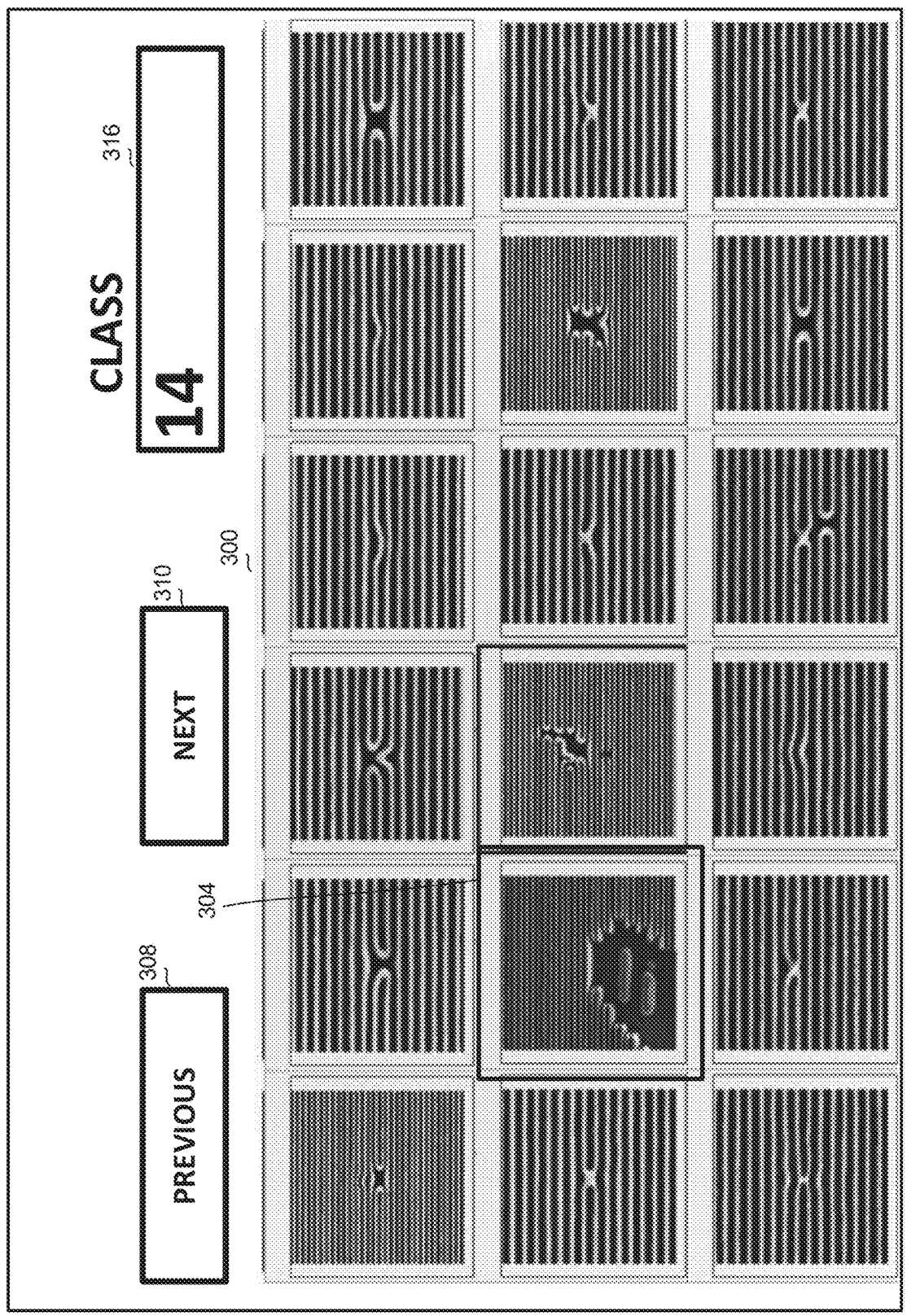
FIG. 3 is an illustrative example of a display of receiving a user's review for an unsupervised cluster, in accordance with certain embodiments of the presently disclosed subject matter.

Reference is made now also to FIG. 3, showing an illustrative example of a display of receiving a user's review for a cluster created by unsupervised clustering.

Cluster presentation 121 of GUI 120 can display a representation of the cluster to a user, as shown in pane 300. The display may comprise images of items, e.g., images of defects clustered to a same cluster. The display may further comprise text box 316 in which the user can provide a label to a class based on the cluster, e.g. a proper name, description or another identifier. The identifier may be provided subject to the user confirming that the defects are indeed related to a same cluster. Otherwise, the user can ignore and move to the previous or next cluster using buttons 308 and 310, respectively. The user may accept the cluster if a significant part of the displayed defects seem related to each other, even if others, such as defect 304, seem unrelated. In some embodiments, the user may accept the cluster while rejecting specific defects from being associated with it.

The user may also enter into text box 316 an identifier of an already existing class, thus indicating that the current defects should be associated with the existing class. Once an identifier is available, the cluster may be regarded as a class.

The defects to be displayed to the user may be selected from the multiplicity of defects clustered to the same cluster, in a multiplicity of methods. For example, a set of defects may be selected which attempts to represent the cluster, such as defects having low accumulated distance to other defects, defects having attribute values close to the average attribute values of the clustered items, or in any other manner.

Clustering (240) and receiving user indications (244) constitute an exemplary implementation of obtaining initial classification (200).

The following steps are performed repeatedly until a stopping criteria is met, as detailed below.

Once as classification has been obtained, training engine 115 may train (248) a classifier upon the defects associated with the created classes.

It is noted that on the first iteration no defect has yet been positively indicated by a user to be associated with a class. Rather, the identified classes may comprise defects that have not been positively associated with the class, but rather displayed as part of the cluster.

In the second and consequent iterations, the classifier is trained upon defects positively associated with each of the classes.

Classification engine 114 can classify (252) all items that have not been positively associated with a class. On the first iteration, all defects may be classified since none has been individually indicated by a user to be positively associated with a class. Classification can be implemented by examining the association of a defect with each of the classes, thus determining a plurality of confidence levels, each indicating a confidence degree that the defect is indeed associated with that class.

Defect selection engine 116 can then select (256) for each class a number of defects for which the confidence level of being associated on the current iteration with that class was higher than the confidence level of being associated with other classes. The number can be predetermined, relative to the number of items classified to the particular class, depend on the level of confidence, subject to user's settings, or the like.

In some examples, the selected defects may be defects classified with the highest confidence level to the particular class, wherein the second highest confidence level is close to the highest one, for example differ by at most a predetermined difference, which means that the classification of this defect may be ambiguous.

In further approaches, the selected defects may be those for which the likelihood of being assigned to the class is lower than the likelihood of other defects to be assigned to the class.

Defect selection (256) can also employ other approaches for selecting the defects to be reviewed by a user. One approach is referred to as exploitation, in which defects close to a center of a class, e.g., to a point having for each attribute a value which is the average of the attribute value of the defects associated with the class, are selected with higher probability. Another approach, referred to as exploration, may seek defects farthest from the class center, in order to define the class boundaries.

It will be appreciated that a combination of the two approaches may also be used, where some defects are selected by exploration, while others are selected by exploitation.

A further approach is referred to as "query by committee", which employs training several classification models. The defects for which the models are indecisive, i.e., different models classify these defects to different classes, are more likely to be selected since receiving a user's input for these defects can help clarify their association.

Yet another approach is referred to as "expectation error reduction", in which a defect is classified to each class, and a model is constructed upon any such classification. The defects classified until that time are then re-classified by each of the classifiers. The defect associated with the minimal error rate can be selected. However, this approach requires intensive computational resources due to the large number of models, being the number of samples, times the number of classes. Thus, if this approach is used, some heuristics may be required in order to reduce the number of models.

It will also be appreciated that the taken approaches can vary between iterations. For example, in order to obtain classification for a significant number of defects in a short time, in the first iteration which is based on clustering, defects may be selected by way of exploitation, while later iterations may select more defects by exploration.

Association presentation 123 of GUI 120 can then display to a user an image or another representation of the defect, and of the class associated with the highest confidence level, and receive (260) an indication from the user whether the item indeed belongs to the class and should be associated with it. The suggested class may be displayed by a collection of images of defects associated with the class.

The disclosed method provides for selecting informative samples without redundancy. The assigned classes are then applied to the unlabeled defects to create a training corpus.

Figure 4:
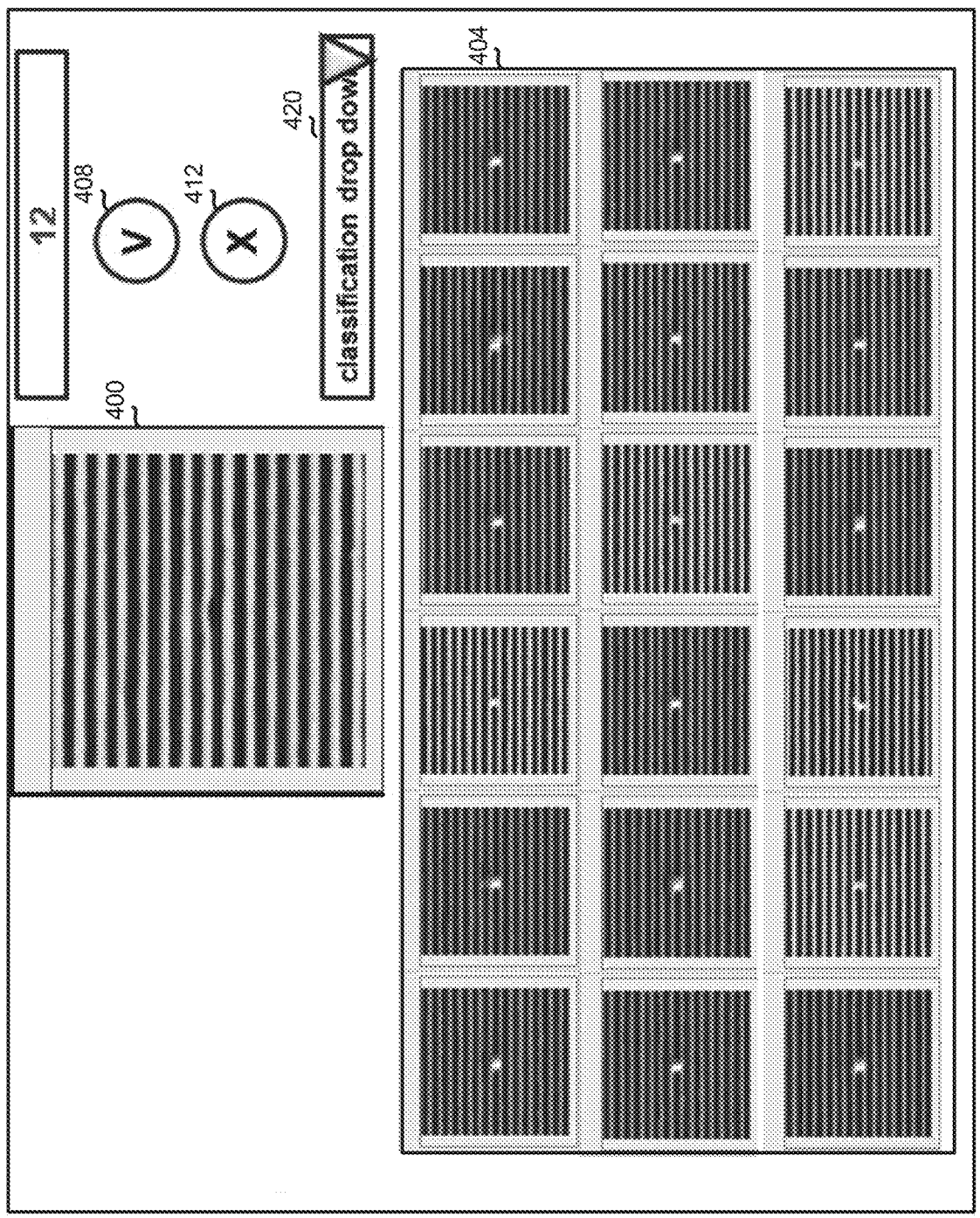
FIG. 4 is an illustrative example of a display of receiving a user's review of a defect suggested to be classified to a class, in accordance with certain embodiments of the presently disclosed subject matter.

Reference is now made to FIG. 4, showing an illustrative example of a display of receiving a user's review of a defect suggested to be classified to a class.

The representation may comprise an image 400 of the defect, and a representation of the class, comprising for example pane 404 that shows a multiplicity of images of defects previously associated with the class. It will be appreciated that after the initial classification, and before any particular defect was positively associated with the class, images of defects clustered to the cluster upon which the class was based, may be displayed.

The representation comprises controls such as check boxes 408 and 412 for the user to indicate whether defect 400 is to be associated with the class or not.

In further implementations, a multiplicity of defects suggested to be associated with the class may be presented simultaneously, rather than one after the other, and a user can indicate, for each defect, whether it is indeed associated with the class or not.

If the user indicates that a displayed defect is not to be associated with the class, then association presentation 123 of GUI 120 can display the defect and the class for which the confidence level was second highest, and receive (264) the user's indication of whether the defect belongs to the second class. It will be appreciated that if the user indicates that the defect is not to be associated with the class, further classes may be displayed for the user's indication. The number of classes attempted may be predetermined, for example three, or set in any other manner.

It will be appreciated that although other approaches exist, giving a user only the option to indicate whether the defect is to be associated with the class or not, rather than multiple choices, provides for a fast pace and error rate reduction.

In some embodiments, if the user does not associate the defect with any of the suggested classes, the user may be presented (216) with the current defect and other defects similar to the current defect. The user can then have an option which may be previously unavailable, to select any class for the defect from classification drop down menu 420. With this display, the user can indicate one or more of the other defects as associated with the same class as well.

The steps above can be repeated until a stopping criteria has been met, for example the user has asked to finalize the process, a predetermined number of iterations has been performed, no unassociated defects exists, all unassociated defects are close to, e.g. at a distance smaller than a predetermined value from associated defects and can thus be assumed to belong to the same class, the number of unassociated defects dropped below a predetermined threshold between iterations, change in class characteristics between iterations being below a predetermined threshold, maximal time has been used, or the like.

Once the stopping criteria has been met, closure operations (220) may be performed.

Once classification is done, the classification may be utilized (272) in a multiplicity of ways. One such way is simply using the classified corpus of defects, for purposes such as research and development (R&D) of a product. A further purpose may be training a classifier for classifying further defects. Yet another purpose may be adapting the parameters of one or more examination tools, e.g., adapting a recipe.

The disclosure can be used for efficiently receiving user verified classification of a multiplicity of defects. The classified defects can be used as is, for training a classifier, for checking other classifications, or for any other purpose.

It will be appreciated that the disclosure is not limited to classifying defects, and can be used for any classifier of items, in any field.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

What is claimed is:

1. A system that assists a user in classifying defects in a specimen being inspected by an inspection tool, the system comprising:
    a hardware-based graphical user interface (GUI) component; and
    a processing and memory circuitry (PMC) to:
        i) upon obtaining data informative of a plurality of defects and attribute values thereof, create an initial classification of at least part of the plurality of defects to be associated with a plurality of classes based on the attribute values, train a classifier based on the initial classification, and use the trained classifier to classify at least part of the plurality of defects which have not been associated with any class, and determine a likelihood of belonging of the classified defects to respective classes of the plurality of classes;
        ii) for each given class from the plurality of classes, present to the user, by the hardware-based GUI component, an image of at least one each given defect from a set of defects initially classified to the given class with a low likelihood of belonging to the given class;
        simultaneously present, in an area of the hardware-based GUI component, images of one or more example defects classified to the given class with the highest likelihood of belonging to the given class; and
        enable the user to manually indicate via the hardware-based GUI component, based on visual comparison of each given defect and the one or more example defects, whether or not the given defect is to be classified to the given class, wherein the manual indication is based on a binary choice, thereby giving rise to an updated classification of the plurality of defects including updated labels of the set of defects in each given class based on the manual indication; and
        iii) use the updated classification to retrain the classifier, and repeat said ii) until a stopping criterion is met.

2. The system of claim 1, wherein the set of defects are a predefined number of defects initially classified to the given class with a lowest likelihood, or all defects initially classified to the given class with a likelihood lower than a predefined threshold likelihood.

3. The system of claim 1, wherein the initial classification of the plurality of defects into the plurality of classes comprises:
    clustering the plurality of defects into clusters in accordance with the attribute values;
    presenting to the user, by the hardware-based GUI component, one or more defects clustered to at least one cluster from the clusters; and
    creating a class based on the at least one cluster, subject to receiving approval from the user, using the hardware-based GUI component, that the one or more defects form a cluster, and receiving an identifier for the class.

4. The system of claim 1, wherein the PMC is further to:
    after rejection by the user, using the hardware-based GUI component, that the given defect is to be classified to the given class:
        present to the user, using the hardware-based GUI component, images of one or more example defects classified to a second class with the highest likelihood of belonging to the second class; and
        subject to confirmation by the user, using the hardware-based GUI component, that the given defect is to be classified to the second class, indicate the given defect as belonging to the second class.

5. The system of claim 4, wherein a first likelihood that the given defect is classified to the given class is higher than a second likelihood that the given defect is classified to the second class.

6. The system of claim 4, wherein the PMC is further to:
    subject to receiving rejection from the user, using the hardware-based GUI component, that the given defect is to be classified to the second class:
        present to the user, using the hardware-based GUI component, the given defect with a multiplicity of additional defects;
        receive from the user, using the hardware-based GUI component, an identifier of a third class; and
        indicate the given defect as belonging to the third class.

7. The system of claim 6, wherein the PMC is further to:
receive from the user, using the hardware-based GUI component, an indication to at least one additional defect from the multiplicity of additional defects; and
indicate the at least one additional defect as belonging to the third class.

8. The system of claim 1, wherein the PMC is further to:
upon completing presenting to the user defects classified to the plurality of classes:
present to the user at least one non-associated defect;
receive from the user an identifier of a fourth class with which the at least one non-associated defect is to be associated; and
associate the at least one non- associated defect with the fourth class.

9. The system of claim 1, wherein the PMC is further to, after the stopping criterion is met, use the updated classification of the plurality of defects for a purpose selected from the group consisting of: determining configuration parameters of an examination tool, and specimen design.

10. A method of assisting a user in classifying defects in a specimen being inspected by an inspection tool, the method comprising:
i) upon obtaining, by a processing and memory circuitry (PMC), data informative of a plurality of defects and attribute values thereof, initially classifying, using the PMC, at least part of the plurality of defects to be associated with a plurality of classes based on the attribute values, training a classifier based on the initial classification, and using the trained classifier to classify at least part of the plurality of defects which have not been associated with any class, and determining a likelihood of belonging of the classified defects to respective classes of the plurality of classes;
ii) for each given class from the plurality of classes, presenting to the user an image of each given defect from a set of defects initially classified to the given class with a low likelihood of belonging to the given class;
simultaneously presenting images of one or more example defects initially classified to the given class with the highest likelihood of belonging to the given class;
enabling the user to manually indicate, based on visual comparison of each given defect and the one or more example defects, whether or not the given defect is to be classified to the given class, wherein the manual indication is based on a binary choice, thereby giving rise to an updated classification of the plurality of defects including updated labels of the set of defects in each given class based on the manual indication; and
iii) using the updated classification to retrain the classifier, and repeating said ii) until a stopping criterion is met.

11. The method of claim 10, wherein the set of defects are a predefined number of defects initially classified to the given class with a lowest likelihood, or all defects initially classified to the given class with a likelihood lower than a predefined threshold likelihood.

12. The method of claim 10, wherein the initial classification of the plurality of defects into the plurality of classes comprises:
clustering the plurality of defects into clusters in accordance with the attribute values;
presenting to the user one or more defects clustered to at least one cluster from the clusters; and
creating a class based on the at least one cluster, subject to receiving approval from the user that the one or more defects form a cluster, and receiving an identifier for the class.

13. The method of claim 10, further comprising:
after rejection by the user that the given defect is to be classified to the given class:
presenting to the user at least one defect with a representation of a second class; and
subject to confirmation by the user that the given defect is to be classified to the second class, indicating the given defect as belonging to the second class.

14. The method of claim 13, wherein a first likelihood that the given defect is classified to the given class is higher than a second likelihood that the given defect is classified to the second class.

15. The method of claim 13, further comprising:
subject to receiving rejection from the user that the given defect is to be classified to the second class:
presenting to the user the at least one given defect with a multiplicity of additional defects;
receiving from the user an identifier of a third class; and
indicating the given defect as belonging to the third class.

16. The method of claim 15, further comprising:
receiving from the user an indication to at least one additional defect from the multiplicity of additional defects; and
indicating the at least one additional defect as belonging to the third class.

17. The method of claim 10, further comprising:
upon completing presenting to the user defects classified to the plurality of classes:
presenting to the user at least one non-associated defect;
receiving from the user an identifier of a fourth class with which the at least one non- associated defect is to be associated; and
associating the at least one non- associated defect with the fourth class.

18. The method of claim 10, further comprising, after the stopping criterion is met, using the updated classification of the plurality of defects for a purpose selected from the group consisting of: determining configuration parameters of an examination tool, and specimen design.

19. A computer software product for assisting a user in classifying defects in a specimen being inspected by an inspection tool, the computer software product comprising a non-transitory computer-readable medium in which program instructions are stored, which instructions, when read by a computer, cause the computer to:
i) upon obtaining, by the computer, data informative of a plurality of defects and attribute values thereof, initially classify, using the computer, at least part of the plurality of defects to be associated with a plurality of classes based on the attribute values, train a classifier based on the initial classification, and use the trained classifier to classify at least part of the plurality of defects which have not been associated with any class, and determine a likelihood of belonging of the classified defects to respective classes of the plurality of classes;
ii) for each given class from the plurality of classes, present to the user an image of each given defect from a set of defects classified to the given class with a low likelihood of belonging to the given class;
simultaneously present images of one or more example defects classified to the given class with the highest likelihood of belonging to the given class; and
enable the user to manually indicate, based on visual comparison of each given defect and the one or more example defects, whether or not the given defect is to be classified to the given class, wherein the manual indication is based on a binary choice, thereby giving rise to an updated classification of the plurality of defects including updated labels of the set of defects in each given class based on the manual indication; and
iii) use the updated classification to retrain the classifier, and repeat said ii) until a stopping criterion is met.

20. The computer software product of claim 19, wherein the image of the given defect and the images of the one or more example defects are presented in an area of a hardware-based GUI component of the computer.

\* \* \* \* \*